J. HUTCHINSON.
INTERNAL COMBUSTION ENGINE.
APPLICATION FILED JULY 28, 1917. RENEWED SEPT. 22, 1919.
1,321,047.
Patented Nov. 4, 1919.
4 SHEETS—SHEET 3.
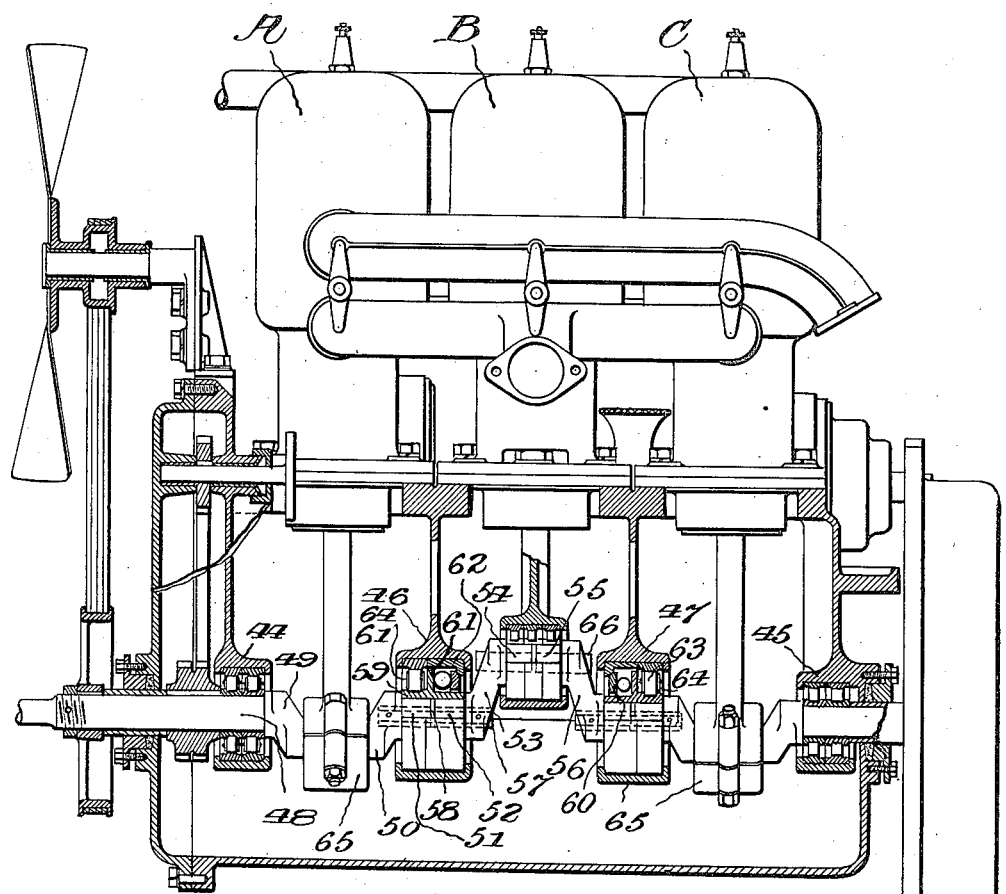
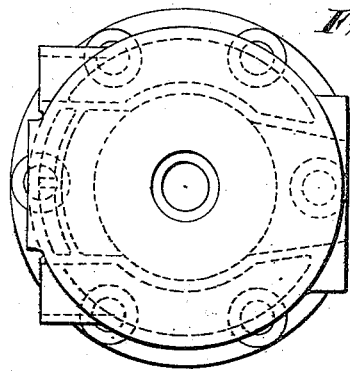
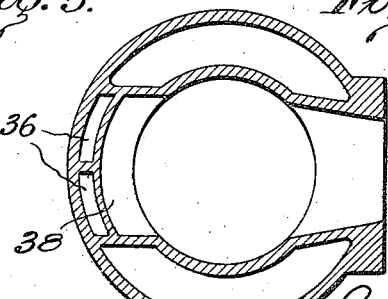
Inventor
Job Hutchinson
By
Attorney

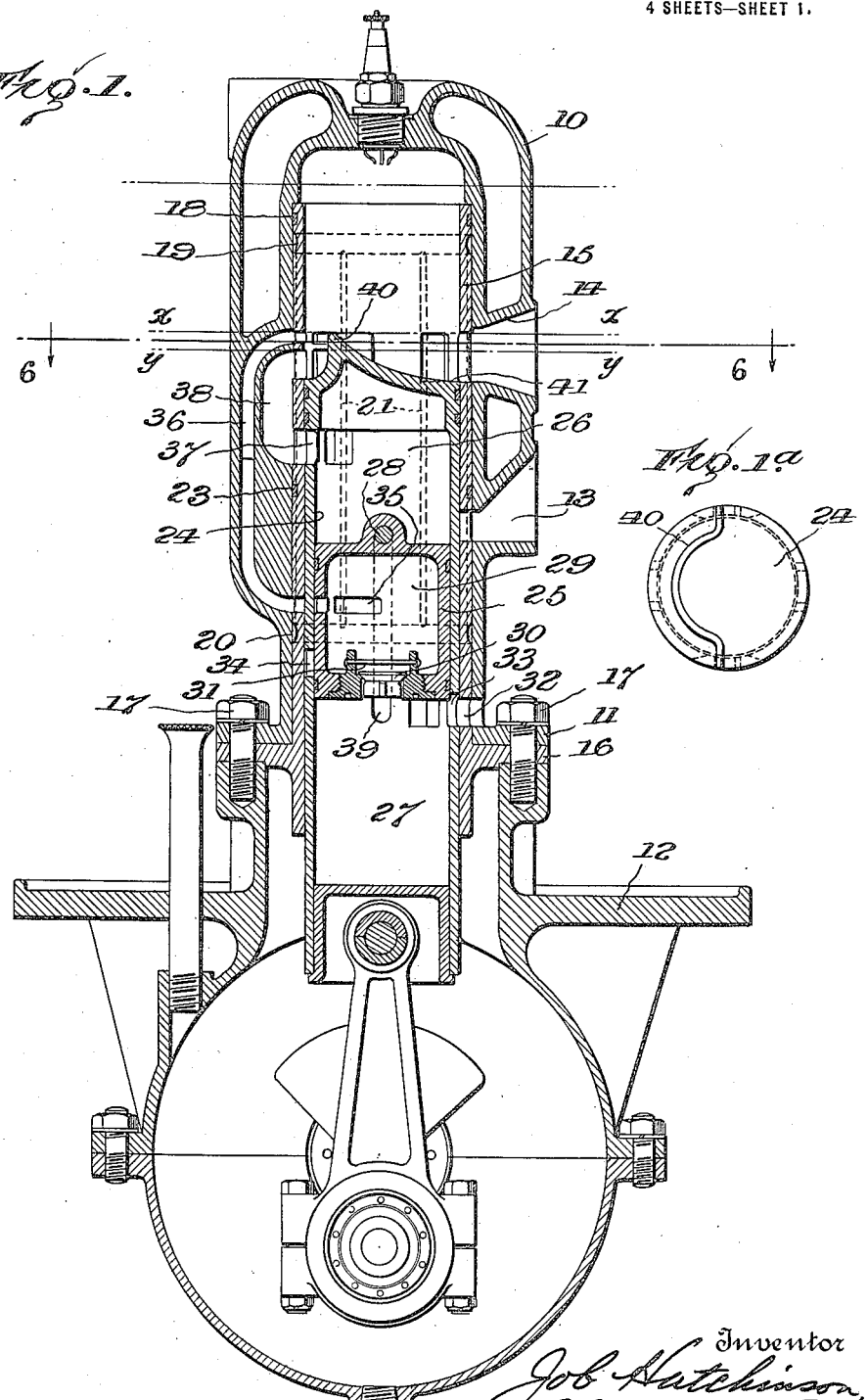

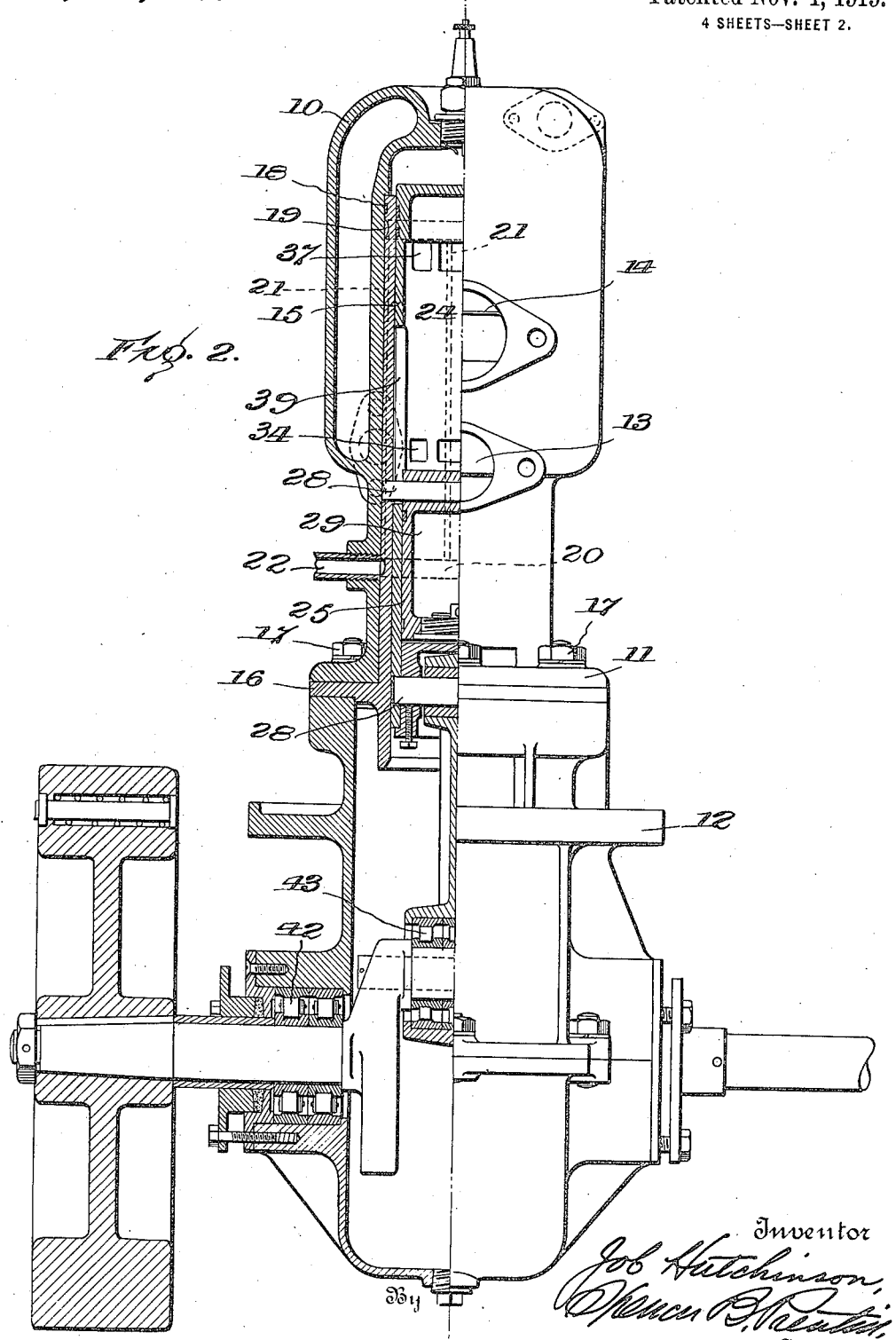

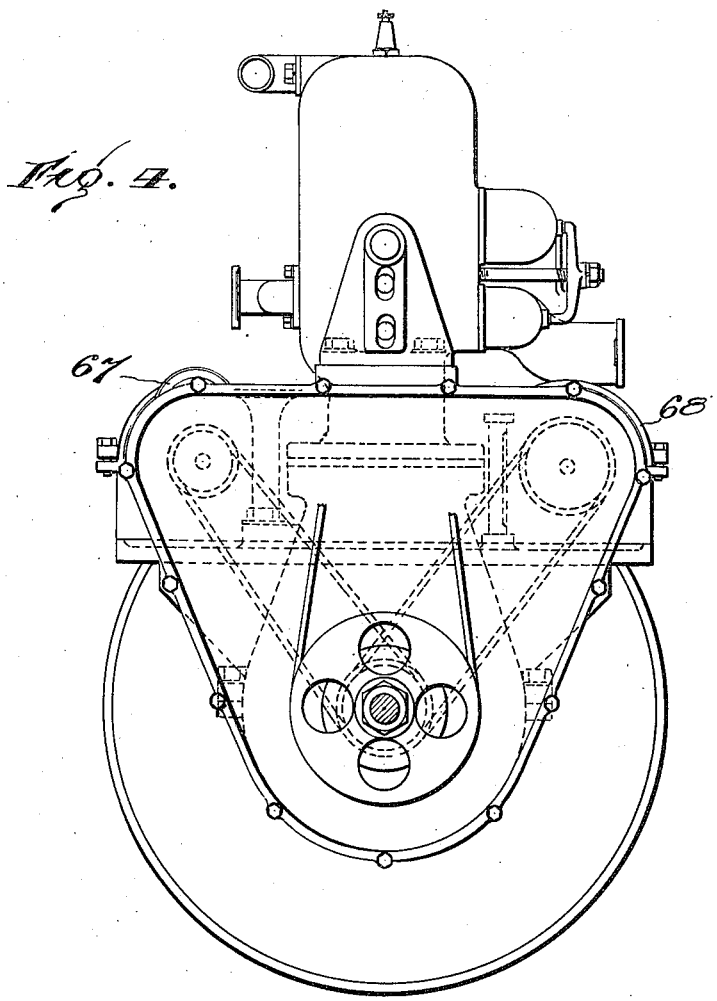

UNITED STATES PATENT OFFICE.

JOB HUTCHINSON, OF BROOKLYN, NEW YORK.

INTERNAL-COMBUSTION ENGINE.

1,321,047.  Specification of Letters Patent.  Patented Nov. 4, 1919.

Application filed July 28, 1917, Serial No. 183,229. Renewed September 22, 1919. Serial No. 325,526.

*To all whom it may concern:*

Be it known that I, JOB HUTCHINSON, a citizen of the United States, residing at Brooklyn, in the county of Kings and State of New York, have invented new and useful Improvements in Internal-Combustion Engines, of which the following is a specification.

My invention relates to internal combustion motors, and particularly to that type known as two-cycle motors.

Two-cycle motors are, for many reasons, preferable to those working on the four-cycle principle, but are subject to objections which render them less suitable for many classes of work. For instance, all two-cycle motors are subject to irregular explosions due to the fact that the fresh charge of gas is contaminated by a portion of the burned gas which remains in the cylinder and mixes with the incoming charge, resulting in a lowering of efficiency. Another cause of decreased efficiency is the escape of a portion of the fresh charge through the exhaust port which is open at the same time as the inlet port. Further, the compression in the crank case is too low to insure rapid and sufficient charge to the cylinder; hence a low compression in the explosion chamber partly mixed with foul gas.

The principal objects of the invention are to provide a motor working on the two-cycle principle, not having the above-mentioned objectionable features, in which the cylinder is scavenged efficiently by fresh air which had been put under compression in a separate chamber; in which the fresh gaseous charge admitted to the cylinder displaces the scavenging fresh air, and hence can not become mixed with burned gases and have its explosive efficiency lowered thereby; in which the initial compression of the charge takes place in a chamber within the piston itself, and not in the crank case, so that all troubles due to crank case compression are eliminated, and a plurality of cylinders may be used as with four-cycle motors; and in which the motor will do the same work as a six-cycle scavenging motor. Other objects will appear as I proceed with the description of the motor.

In constructing my motor I provide a floating piston, or what may be termed an abutment, held stationary inside of the working piston, which latter is made of sufficient length and size to provide two chambers—one upon one side of the abutment constituting an initial compression chamber for the explosive charge, and the other upon the other side of the abutment constituting an intake air chamber from which the scavenging air is compressed into a chamber provided within the fixed abutment. The air chamber within the abutment is charged with compressed air on up-stroke, and discharged into the cylinder to thoroughly scavenge the same before the fresh charge is admitted from the charge-compression within the piston on the other side of the abutment. These and other features of the invention will more fully appear hereinafter.

The invention consists in the novel construction and arrangement of parts of an internal combustion motor hereinafter described and claimed and shown in the accompanying drawings, and which will be fully understood as thus explained.

The invention is illustrated in the accompanying drawings, in which—

Figure 1 is a longitudinal section of a one-cylinder motor, showing the piston at the outward limit of its stroke;

Fig. 1ᵃ is an end view of the upper end of the piston;

Fig. 2 is a view taken at right angles to Fig. 1, and showing the construction partly in elevation and partly in longitudinal section;

Fig. 3 is a side view of a three-cylinder motor embodying the invention, the cylinders being shown in elevation and the crank case and crank shaft in longitudinal vertical section in order to show the construction of the shaft and both the shaft bearings and the bearings of the pitmen connections;

Fig. 4 is a view in end elevation of the motor shown in Fig. 3.

Fig. 5 is a top plan view of the cylinder casting.

Fig. 6 is a section through the same taken on line 6—6 of Fig. 1.

Referring to the drawings, in which like reference characters indicate the same parts throughout, 10 indicates a cylinder casting which may be made in accordance with the general practice to provide a water jacket, and also having a flange 11 by means of which it may be mounted upon a suitable base 12. The charge inlet connection of the cylinder casting is shown at 13, and the exhaust connection is shown at 14.

The cylinder is preferably provided with a sleeve or lining 15 which fits snugly within the casting and has an inner bore within which the piston works. This sleeve 15 is provided with a flange 16 which is also supported upon the base 12, and both this and the flange 11 of the cylinder casting are secured by bolts 17 or in any other suitable manner. There is thus formed a tight joint at the lower end between the cylinder casting and the sleeve 15, and at the other end of the sleeve is preferably provided a packing 18 in order to allow for any inequality of expansion of the casting and sleeve when these are made of dissimilar metals having different co-efficients of expansion. For instance, it is sometimes desirable to make the cylinder casting 10 of aluminum, and the sleeve 15 of cast iron. In order to assist in making a tight connection between the cylinder casting and sleeve, I preferably provide an annular groove 19 on the outer surface of sleeve 15 near the upper end thereof, and a second annular groove 20 at a distance therefrom, these grooves being connected by any suitable number of longitudinal grooves 21. These grooves are supplied with oil through a connection 22, and any oil which leaks past the packing 18 will enter the cylinder and assist in lubricating the piston. Packing rings may also be provided between the sleeve 15 and the cylinder casting at any other suitable point such as at 23.

Within the cylinder is mounted an elongated hollow piston 24 provided with suitable packing rings, and made of sufficient length to provide chambers for the initial compression of the combustible charge, and also for the compression of fresh air to be used in scavenging the combustion chamber. For this purpose there is mounted within the hollow piston 24 an abutment 25 which is prevented from moving with the piston so that the piston moves with respect to the abutment. This abutment is constructed to divide the space within the hollow piston into an initial compression chamber 26 for the charge upon one side of the abutment, and an air compressing chamber 27 upon the other side of the abutment. The abutment itself is preferably anchored to the sleeve 15 by means of a pin 28, or in any other suitable manner, and is provided with packing rings so as to make an air and gas-tight contact with the bore of the hollow piston. The abutment 25 is also preferably provided with an air storage chamber 29 having a connection with air compressing chamber 27 in which connection is located a check valve 30. This valve is held in any suitable cage from being thrown too far off its seat, a small pin 31 being one way of accomplishing this object.

The cylinder is provided with an air intake port, 32, through which air may be admitted through a port 33 in the hollow piston, when these ports are in registry, to the air compressing chamber 27. On the opposite side of the piston is provided an air delivery port 34 which is adapted to be brought into registry with the port 35 in the compressed air storage chamber and thus establish communication with a channel 36 communicating with the combustion chamber of the cylinder above the piston.

The charge initial compression chamber 26 is adapted to be connected by port 33 of the hollow piston coming in registry with inlet port 13, and by a delivery port 37 with a channel 38 communicating with the combustion chamber above the piston.

The piston is capable of movement from the lowermost position or outward end of its stroke shown in Fig. 1, to the innermost position of its stroke shown in Fig. 2, the anchoring pin 28 of abutment 25 extending through slots 39. The cycle of operation will now be described.

With the parts in the position shown in Fig. 1, the charge formerly compressed in initial compression chamber 26 has been admitted to the combustion chamber above the piston through channel 38, and by striking the upstanding projection 40 has been evenly distributed throughout the combustion chamber. Air has been admitted through ports 32 and 33 to air compressing chamber 27, and the piston starts upon its inward stroke in which the charge is compressed in the combustion chamber. The air inlet port is now closed by port 33 passing out of registry with port 32, and air is compressed in air compressing chamber 27 and is forced past check valve 30 and into air storage chamber 29. The upper end of the piston has now closed the exhaust port 14 and hence while air is being compressed and stored in chamber 29, the charge is being compressed in the combustion chamber. When the piston reaches the innermost position of its stroke, as shown in Fig. 2, the charge is fired in any known manner. The check valve 30 is closed so that the air compressed in chamber 29 can not return to the air compressing chamber 27. At the same time port 33 of the hollow piston has come into registry with inlet port 13 and a new charge is admitted to initial compression chamber 26 within the piston.

Under the impulse of the explosion the piston starts upon its outward stroke, and this impulse continues until the upper end of the piston 41 has passed the position indicated by the line $x$ in Fig. 1, when the exhaust port 14 begins to open and the burned gases begin to exhaust from the combustion chamber. At the same time port 34 in the hollow piston comes into registry with port 35 of the air storage chamber 29, and compressed air is admitted to the combustion chamber through conduit 36. This flow of air strikes the projection or baffle 40 and is distributed through the combustion chamber to thoroughly scavenge the same. It will be understood that the amount of air thus admitted and its degree of compression are determined by the size and relative proportions of the compressed air storage chamber and the air compressing chamber, and hence may be designed to completely replace the burning gases by fresh air throughout the combustion chamber. Besides eliminating all of the burned gases from the combustion chamber, the fresh air thus introduced tends to cool the piston head and the walls of the combustion chamber, and thus assist in preventing the motor from over-heating.

When the end 41 of the piston reaches the position indicated by the line $y$, the port 37 of the piston opens communication with conduit 38, and thus admits the fresh charge which during the outward stroke of the piston has been compressed in initial compression chamber 26, to the combustion chamber as above indicated, and the cycle is complete. As the piston is now nearing the outward end of its stroke port 33 again comes into registry with port 32, and air is admitted to the air compressing chamber 27, as before. It will thus be seen that the cycle is complete for every revolution of the motor, and that the fresh charge is not compressed within the crank casing.

In illustrating my invention I have shown the motor provided with roller bearings 42 for the crank shaft, and also roller bearings for the pitman connection as shown at 43. These are more clearly illustrated in Fig. 3 which shows the motor construction embodied in a three-cylinder motor designed to perform the function of a six-cylinder four-cycle motor. By eliminating the necessity for crank case compression of the charge, the three cylinders are mounted upon the same crank case, as is done with four-cycle motors. Referring now particularly to Figs. 3 and 4, the main bearings 44 and 45 are shown as roller bearings which may be of ordinary construction. In order to permit the use of roller bearings for the intermediate bearings 46 and 47, I have designed a special construction of crank shafts and roller and ball bearings which may be briefly described as follows.

The crank shaft is made up of sections, the forward section 48 engaging the main bearing 44 and having half of the crank 49 of cylinder A. The next section includes the other half of this crank 50 and extends by means of a stub 51 to form a portion of the shaft between the first and second cranks. The next section has stub 52, crank half 53 and stub 54 which forms part of the crank of cylinder B. The other half of this crank is formed by stub 55 and arm 56.

The shaft stubs 51 and 52 are connected by a pin or member 57, which is preferably hexagonal in cross section or any suitable form so that the stubs 51 and 52 may be set and held at any desired angle. These pins are secured in place in any suitable manner and have a central flange 58 the outer surface of which alines with the stubs 51 and 52. In assembling the bearing for the shaft at this point, before the stubs are secured in place, a sleeve 59 is slipped on carrying a ball ring 60 and a flange 61 between which latter elements the balls are carried. These parts are inclosed within the ring 62. Rollers 63 with their rings 64 are then put in place, stub 51 inserted and secured in the manner above described, and the lower half 65 of the bearing shell secured in place.

The crank and bearing of the pitman of cylinder B are assembled in a similar manner. But here only roller bearings are employed and the pin 66 is round instead of hexagonal. By this construction a very strong and smooth running crank shaft is obtained, as will be readily understood.

Referring to Fig. 4, it will be seen that the magneto 67 and the generator 68 are driven from the crank shaft in the usual manner. Further and detailed description of this construction is believed to be unnecessary.

In illustrating the construction of a motor built in accordance with my invention, I have shown sleeve 15 and also the water jacket much heavier than is necessary in practice, but it will be understood that these may be made of any suitable thickness and proportions as may be found necessary. Also I do not wish to limit myself or the scope of the invention to the exact proportions and shape of the parts shown. For instance, I have spoken of an exhaust port and an intake port, and in illustrating these have shown several openings in each instance in order to provide the proper area of communication. This also is a matter to be determined in practice in accordance with the requirements of individual motors. It will be understood that any changes in the construction and arrangement of parts may be made without departing from the invention, and these I aim to include within the scope of the appended claims.

I claim as my invention:—

1. An internal combustion motor comprising a cylinder, a hollow piston working in said cylinder, and an abutment within said piston with relation to which the piston is movable and which divides the space within the piston into an initial compression chamber for the charge and an air compressing chamber.

2. An internal combustion motor comprising a cylinder, a hollow piston working in said cylinder, and a fixed abutment within said piston which divides the space within the piston into an initial compression chamber for the charge and an air compressing chamber.

3. An internal combustion motor comprising an elongated hollow piston, and means for dividing the space therein into an initial compression chamber for the charge and an air compressing chamber.

4. An internal combustion motor comprising a cylinder, a hollow piston working within said cylinder, an abutment within said piston which divides the space within the piston into an initial compression chamber for the charge and an air compressing chamber, and a locking pin engaging said abutment and said cylinder walls for anchoring said abutment within said cylinder.

5. An internal combustion motor comprising a cylinder, a hollow piston working in said cylinder and provided with longitudinal slots for a portion of its length, an abutment within said piston which divides the interior thereof into an initial compression chamber for the charge and an air compressing chamber, and a locking pin engaging said abutment and extending through said slots into engagement with said cylinder walls for anchoring said abutment within said cylinder.

6. An internal combustion motor comprising a cylinder provided with a sleeve, a hollow piston working within the sleeve of said cylinder, a fixed abutment within said piston which divides the space within the piston into an initial compression chamber for the charge and an air compressing chamber, and a locking pin engaging said abutment and said sleeve for securing said abutment in fixed position.

7. An internal combustion motor comprising a cylinder casting of light metal provided with a fixedly mounted sleeve of relatively heavy metal, a hollow piston working within the sleeve of said cylinder casting, a fixed abutment within said piston which divides the space within the piston into an initial compression chamber for the charge and an air compressing chamber, and a locking pin engaging said abutment and said sleeve for securing said abutment in fixed position.

8. An internal combustion motor comprising a cylinder casting provided with a sleeve, a hollow piston working within said sleeve, a fixed abutment within said piston which divides the space within said piston into an initial compression chamber for the charge and an air compressing chamber, a closed joint between said casting and said sleeve at one end, a packing ring near the other end of said sleeve, an annular groove formed in the outer surface of said sleeve, a plurality of longitudinal grooves extending from said annular groove, and a connection for supplying oil under pressure to said grooves.

9. An internal combustion motor comprising a cylinder, a hollow piston working in said cylinder, a fixed abutment within said piston which divides the space within the piston into an initial compression chamber for the charge and an air compressing chamber, said compression chamber wall and said cylinder having charge inlet ports which register to admit the charge, and also having discharge ports which register when the charge has been compressed, and a conduit connecting the discharge ports with the explosion chamber of the cylinder above the piston.

10. An internal combustion motor comprising a cylinder, a hollow piston working in said cylinder, a fixed abutment within said piston which divides the space within the piston into an initial compression chamber for the charge and an air compressing chamber, said initial compression chamber wall and said cylinder having charge inlet ports which are positioned to register with each other to admit the charge when the piston nears the inward position of its stroke, and also having discharge ports which register when the charge has been compressed, and a conduit connecting the discharge ports with the explosion chamber of the cylinder above the piston.

11. An internal combustion motor comprising a cylinder, a hollow piston working in said cylinder, a fixed abutment within said piston which divides the space within the piston into an initial compression chamber for the charge and an air compressing chamber, said abutment formed with a compressed air storage chamber communicating with said air compressing chamber, and a check valve in the communication between said last mentioned chambers.

12. An internal combustion motor comprising a cylinder, a hollow piston working in said cylinder, a fixed abutment within said piston which divides the space within the piston into an initial compression chamber for the charge and an air compressing chamber, said abutment formed with a compressed air storage chamber communicating with said air compressing chamber, said abutment chamber wall and said hollow piston having air discharge ports which register to discharge the air from said air storage chamber, and a conduit connecting said discharge ports with the explosion chamber of said cylinder above the piston.

13. An internal combustion motor comprising a cylinder, a hollow piston working in said cylinder, a fixed abutment within said piston which divides the space within the piston into an initial compression chamber for the charge and an air compressing chamber, said abutment formed with a compressed air storage chamber communicating with said air compressing chamber, the explosion chamber of said cylinder provided with an exhaust port which is uncovered by said piston near the end of its outward stroke, said air storage chamber wall and said hollow piston having air discharge ports which register near the outward end of the piston stroke to discharge the air from said air storage chamber, and a conduit connecting said discharge ports with said explosion chamber for scavenging the same.

14. An internal combustion motor comprising a cylinder, a hollow piston working in said cylinder, a fixed abutment within said piston which divides the space within the piston into an initial compression chamber for the charge and an air compressing chamber, said cylinder provided with a charge inlet port and also an air inlet port, and said hollow piston provided with a port which in one position of said piston registers with said charge inlet port to admit a charge to said charge initial compression chamber and in another position of said piston registers with said air inlet port to admit air to said air compressing chamber.

15. An internal combustion motor comprising a cylinder, a hollow piston working in said cylinder, a fixed abutment within said cylinder provided with suitable packing engaging said hollow piston walls and which abutment divides the space within the piston into an initial compression chamber for the charge and an air compressing chamber, said abutment provided with a compressed air storage chamber, and valve controlled connections between said compressed air storage chamber and the explosion chamber of said cylinder and between said initial compression chamber and said explosion chamber for first delivering fresh air to scavenge said explosion chamber and then to deliver to said explosion chamber the charge compressed in said initial compression chamber.

16. An internal combustion engine including a cylinder, an elongated hollow piston therein having one end thereof forming the movable wall of the sole working chamber, and an abutment within the piston having a fixed engagement with the cylinder, and coöperating with the end of the piston opposite that forming one wall of the combustion chamber to provide a compression chamber.

17. An internal combustion engine including a cylinder, an elongated hollow piston therein having one end forming the movable abutment of the sole working chamber, and a fixed abutment within the piston having a fixed engagement with the cylinder and also having one side thereof coöperating with one of the ends of said piston to provide an initial compression chamber for the charge.

In testimony whereof I have hereunto set my hand.

JOB HUTCHINSON.